US011326929B2

(12) United States Patent
Sinker et al.

(10) Patent No.: US 11,326,929 B2
(45) Date of Patent: May 10, 2022

(54) SEPARATED SOLIDS MONITORING SYSTEM

(71) Applicant: D & P Innovations Sdn. Bhd., Kuala Lumpur (MY)

(72) Inventors: Alastair Sinker, Hampshire (GB); Dat Suan Goo, Kuala Lumpur (MY)

(73) Assignee: D & P INNOVATIONS SDN. BHD., Kuala Lumpur (MY)

( * ) Notice: Subject to any disclaimer, the term of this patent is extended or adjusted under 35 U.S.C. 154(b) by 0 days.

(21) Appl. No.: 16/763,807

(22) PCT Filed: Nov. 12, 2018

(86) PCT No.: PCT/GB2018/053256
§ 371 (c)(1),
(2) Date: May 13, 2020

(87) PCT Pub. No.: WO2019/097209
PCT Pub. Date: May 23, 2019

(65) Prior Publication Data
US 2020/0278237 A1 Sep. 3, 2020

(30) Foreign Application Priority Data
Nov. 14, 2017 (MY) .......................... PI 2017704336

(51) Int. Cl.
*G01G 3/14* (2006.01)
(52) U.S. Cl.
CPC ................................ *G01G 3/1418* (2013.01)
(58) Field of Classification Search
CPC ...... G01G 3/1418; E21B 43/34; B01D 21/267
See application file for complete search history.

(56) References Cited

U.S. PATENT DOCUMENTS 4,520,339 A * 5/1985 Utsunomiya ............. G01L 1/22
177/211
5,280,141 A * 1/1994 Neeleman ............... G01G 21/30
177/211
(Continued)

FOREIGN PATENT DOCUMENTS

GB 2529729 3/2016
GB 2547044 8/2017
(Continued)

OTHER PUBLICATIONS

International Search Report and Written Opinion dated Feb. 11, 2019, in connection with International Application No. PCT/GB2018/053256 (11 pages).

*Primary Examiner* — Natalie Huls
(74) *Attorney, Agent, or Firm* — McCracken & Gillen LLC

(57) ABSTRACT

A separated solids monitoring system comprising a pressurised solids accumulator for receiving separated process solids, a weighing platform located inside the accumulator and arranged to carry process solids as they settle in the accumulator, a force transducer located inside the pressurised accumulator and mechanically coupled to the weighing platform to provide a weight signal which is a measure of gravitational force on the weighing platform, and mechanically based pressure compensation means integrated within the force transducer, and arranged substantially to compensate and remove a force offset in the weight signal due to the pressure of fluids in the solids accumulator thereby allowing a fuller measurement range of the force transducer to be used and substantially dedicated to indicating a mass of solids on the weighing platform.

11 Claims, 3 Drawing Sheets

(56) References Cited

U.S. PATENT DOCUMENTS

| | | | | |
|---|---|---|---|---|
| 2010/0193414 A1* | 8/2010 | Arefjord | ................ | B04C 9/00 |
| | | | | 210/86 |
| 2014/0373492 A1* | 12/2014 | Arefjord | ............... | B01D 45/16 |
| | | | | 55/462 |
| 2019/0063203 A1* | 2/2019 | Arefjord | ............ | B01D 17/0214 |
| 2019/0178071 A1* | 6/2019 | Arefjord | ................ | B04C 5/28 |
| 2020/0324323 A1* | 10/2020 | Bruntveit | .......... | B01D 21/0024 |

FOREIGN PATENT DOCUMENTS

| | | |
|---|---|---|
| GB | 2549977 | 11/2017 |
| WO | WO2015005998 | 1/2015 |

* cited by examiner

SEPARATED SOLIDS MONITORING SYSTEM

TECHNICAL BACKGROUND

In the field of process equipment suppliers in the upstream oil and gas industry and in particular, systems that separate and treat produced solids and water on offshore production platforms there is a need periodically to remove produced solids from the process in order to allow continued operation. In high pressure applications (e.g. up to 20 kpsi) MultiPhase Desanding (MPD) systems are used to knock out sand and other solids from the raw multiphase well fluids to protect the downstream process. An MPD configuration (see FIG. 1), described as a separate accumulator configuration, typically consists of two main vessels, the upper vessel contains a Multiphase Desanding Cyclone which separates the sand from the multiphase flow stream and passes it into a lower collection vessel typically called an accumulator. The system runs continuously and so the accumulator needs to be emptied periodically. This is done by isolating the accumulator from the Desanding cyclone by closing valves between the two vessels (the cyclone remains running since there is sufficient hold up volume in the bottom of the upper, cyclone vessel for the separated solids to collect temporarily while the accumulator is offline), depressurising it to near atmosphere, and then pumping in flush water to purge the solids to another solids handling system. Once the accumulator is clear of solids, it remains full of clean water and is then repressurised before being reconnected to the upper Desanding cyclone vessel by reopening the valves. Solids that have been separated and collected in the bottom of the upper vessel while the accumulator has been offline then simply fall into the accumulator once it has been de-isolated.

These MPD systems can work very well but one of the key challenges is to determine when the accumulator is full in order to minimise the number of accumulator purges that are performed. The current most reliable method is a solids level detection method which uses Nucleonics. This employs a radioactive source (usually Cobalt 6) positioned on the outside of the vessel on one side (just clamped on, no nozzle required) and a multi detector array on the other side (again just clamped on, no nozzle required). This effectively detects the density of the medium in the radioactive beam and thus can distinguish between (i) water and (ii) solids & water, even when fired through thick walled vessels. The technique is reliable but expensive, lacks resolution and not practical in many parts of the world due to licensing difficulties associated with a radioactive source. This becomes even more problematic for mobile MPD systems used by well service companies. Operators and well service companies also currently find it difficult to determine when and how solids are being produced from a well—for example, is the solids production consistent or does it come through in time-varying quantities?

One partial solution to this problem is mentioned briefly in US2014/037349A, which shows a collecting bucket 13 resting on load cell 7 which forms part of the external wall of an accumulator vessel. This is stated to be used to weigh the amount of sand or other material that has ended up in the bucket, but there is no detailed or sufficient disclosure of how to achieve this.

GB2529779A discloses another cyclonic separator in which a weight bucket is mechanically connected to an external load cell (since it is external, it is operating at atmospheric pressure) which measures the downward force on the bucket. This disclosure acknowledges the need to compensate for the forces caused by the internal pressure in the vessel. It is noted that the force on the bucket has two components—weight of solids in the bucket and internal pressure of the unit. This force exerted by the internal pressure in the accumulator is compensated by a separate pressure sensor for sensing internal fluid pressure in the vicinity of the bucket, in the pressurised part of the unit and which is used as a second input to a controller. The controller then computes the weight of the solids, by removing the weight component caused by the internal pressure, using the pressure sensor input and load cell input.

SUMMARY OF THE INVENTION

According to a first aspect, the invention provides a separated solids monitoring system comprising a pressurised solids accumulator for receiving separated process solids, a weighing platform located inside the accumulator and arranged to carry process solids as they settle in the accumulator, a force transducer located inside the pressurised accumulator and mechanically coupled to the weighing platform to provide a weight signal which is a measure of gravitational force on the weighing platform, and mechanically based pressure compensation means integrated within the force transducer, and arranged substantially to compensate and remove a force offset in the weight signal due to the pressure of fluids in the solids accumulator thereby allowing a fuller measurement range of the force transducer to be used and substantially dedicated to indicating a mass of solids on the weighing platform.

Such a real time solids quantity measurement is extremely valuable to determine the overall performance of a well and in the case of well service operations, how efficient the well workover procedures have been. One important aspect is to completely enclose the measurement system inside the accumulator and thus the only element which needs to "pass through" the pressure seal barrier is an electrical connection carrying measurement signals out of the accumulator. This implies that the full measurement range of the sensor is used only to determine the weight of the solids and, as in the case of the prior art, that resolution is not suppressed by having to also measure the effect of the internal pressure which will become increasingly dominant as the internal pressure increases. Also, since the internally mounted weight sensor is operating substantially at the same pressure as the internal operating pressure of the accumulator, the internally mounted weight sensor does not require any remote pressure compensation, thus reducing complexity while increasing accuracy and resolution.

BRIEF DESCRIPTION OF THE DRAWINGS

Embodiments of the invention will now be described by way of example, and with reference to the drawings in which.

DETAILED DESCRIPTION OF THE INVENTION

Figure 1:
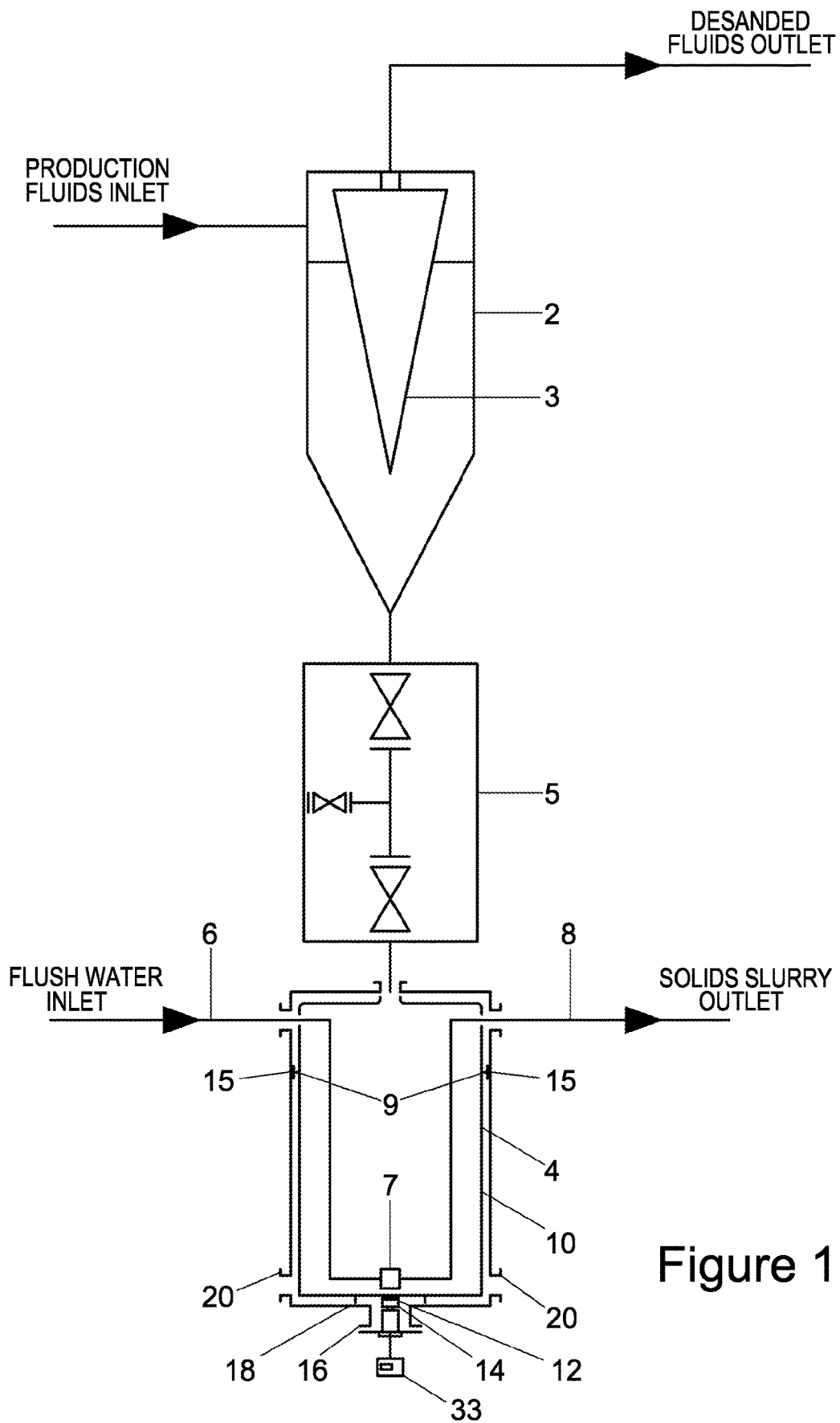
FIG. 1 is a schematic of an MPD separator (cyclonic, separate accumulator) and separated solids monitoring system.

With reference to FIG. 1, an MPD separator typically consists of two main vessels, an upper vessel 2 which contains a desanding cyclone 3 which separates the solids from the multiphase flow stream, and passes it into a lower collection vessel 4 typically called an accumulator.

The system runs continuously and so the accumulator 4 needs to be emptied of separated solids periodically. This is done by isolating the accumulator from the desanding cyclone by closing a valve set 5 (either a double block and bleed, as shown, or a single block isolation, not shown) between the two vessels (the cyclone 3 remains running since there is sufficient hold up volume in the bottom of the upper, cyclone vessel 2 for the separated solids to collect temporarily while the accumulator is offline), depressurising the accumulator to near atmosphere (depressurisation line not shown), and then pumping in flush water via flush inlet 6 to first fluidise the solids via a fluidisation nozzle 7 and then purge the solids, via a solids slurry outlet 8, to another post separation solids handling system (not shown).

Once the accumulator 4 is clear of solids, it remains full of clean water and is then repressurised (repressurisation line not shown) before being reconnected to the upper desanding cyclone vessel 2 by reopening the valve set 5. Solids that have been separated and collected in the bottom of the upper vessel 2 while the accumulator has been offline then falls into the accumulator 4 once it has been reconnected.

An internal weighing platform 10 typically with raised sides forming a container having an open or partially open top (i.e. like a bucket or bin) but not necessarily with a shape that conforms to the internal dimensions of the accumulator 4, is located inside the accumulator 4 and has contact with the internal accumulator walls at a number of, typically four to seven single points. A typical arrangement is sliding contact via some pins 9 at the top distributed around the outside of the raised sides of the platform, and a button 12 on top of a load cell assembly 14 (LCA), or "Force Tranducer" at the platform's base. Thus allowing the platform to move vertically against the resistance of the load cell assembly, depending on the weight of solids contained on the platform.

The accumulator internal wall at the elevation of the upper support pins typically has a ring of corrosion resistant weld overlay 15 (typically a nickel-molybdenum alloy) which is then machined smooth. This ensures that there is no potential for corrosion which may prevent 100% of the load in the platform being transferred to the LCA.

Flush water in, and solids slurry out, is preferably handled by the pipework 6, 8 entering and exiting the weighing platform 10 from the top, to avoid any connections which also might interfere with the solids mass measurement.

The load cell assembly may be installed and removed via a bottom nozzle 16. A small pipe section 18 is welded either to the bottom of the accumulator 4 (not shown) or to the bottom of the weighing platform 10 (shown) so that when the load cell assembly 14 is removed, the platform 10 drops only a few millimetres until it is supported by the pipe section. In this way, the load cell assembly can be nearly installed into position without having to lift the platform as well, the mounting nuts of the load cell can then be installed and then the load cell will be engaged with the platform during the final nut tightening process. This also allows the load cell to be easily disengaged from the weigh platform 10 by loosening the mounting nuts and withdrawing the load cell slightly so that it is "protected" inside the outer pipe spool to prevent possible shock loading when the equipment is being transported from job to job. However, this can also be accomplished by the location of a shock absorbing element (either material or mechanical) between the LCA and platform. Two lower nozzles 20 in the main accumulator vessel, are provided for maintenance flushing of the space between the outside of the platform 10 and the inside of the accumulator 4, in order to prevent solids building up in this space. Otherwise the solids may serve to become weight bearing and thus prevent 100% transfer of mass to the load cell.

Figure 2:
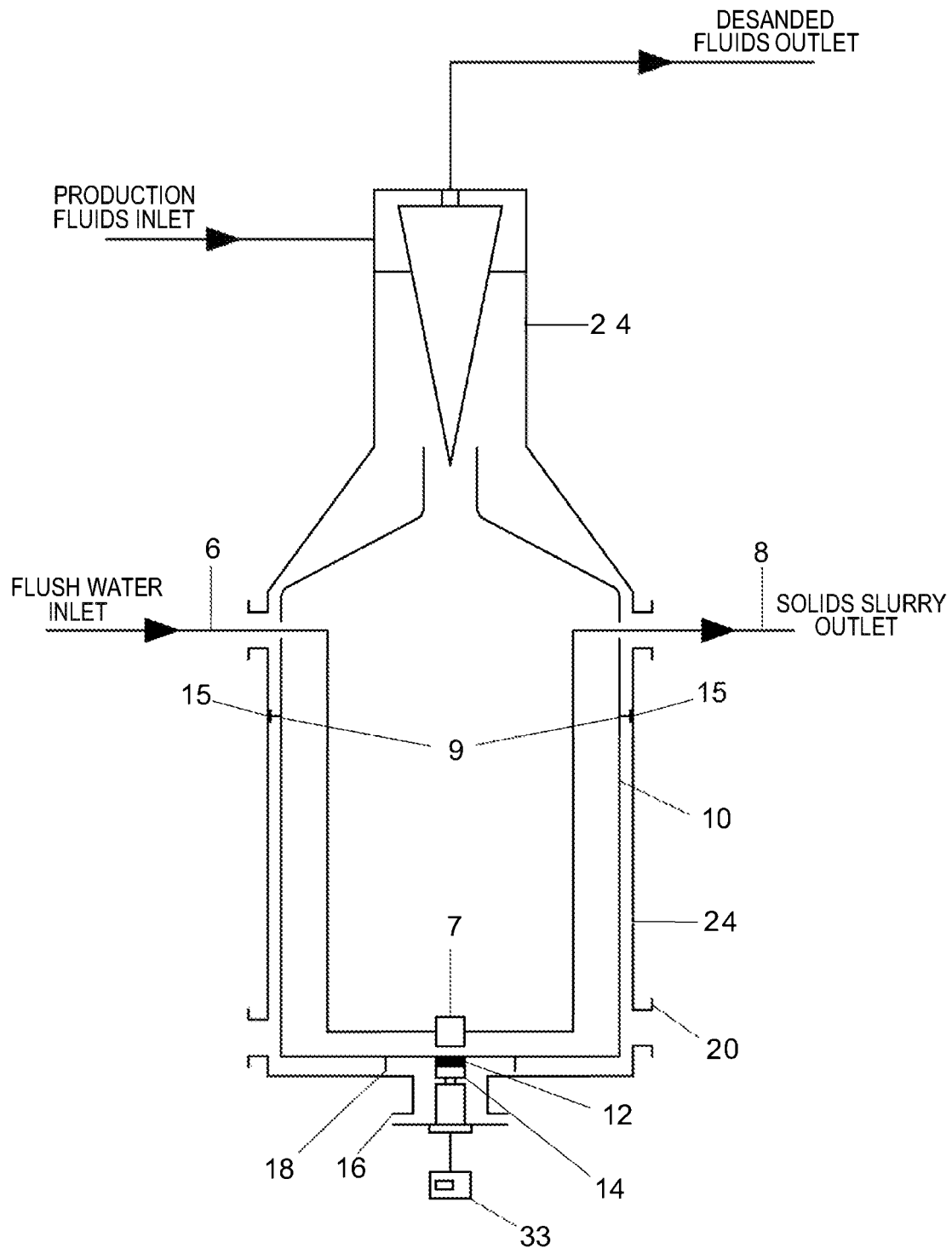
FIG. 2 is a schematic of an alternately configured MPD separator (cyclonic, integrated accumulator) and separated solids monitoring system.

An alternative MPD configuration is show in FIG. 2 and may be described as an integrated accumulator configuration, consists of only a single vessel which houses and performs both the Multiphase Desanding Cyclone and the solids accumulation functions. The functionality of this MPD configuration is identical to that of the FIG. 11 configuration with the only difference being that the accumulator section cannot be isolated from the MPD cyclone section by external valving. Therefore, when the accumulator needs to be purged periodically of separated solids, it can be done either offline, by isolating and venting the whole vessel and bringing online a standby integrated MPD vessel (duty/standby configuration) or online, purging the accumulator at the operating pressure using a downstream high integrity sacrificial choke valve, or other such slurry depressurisation device, to depressure the slurry and route to a low pressure solids handling system.

Figure 3:
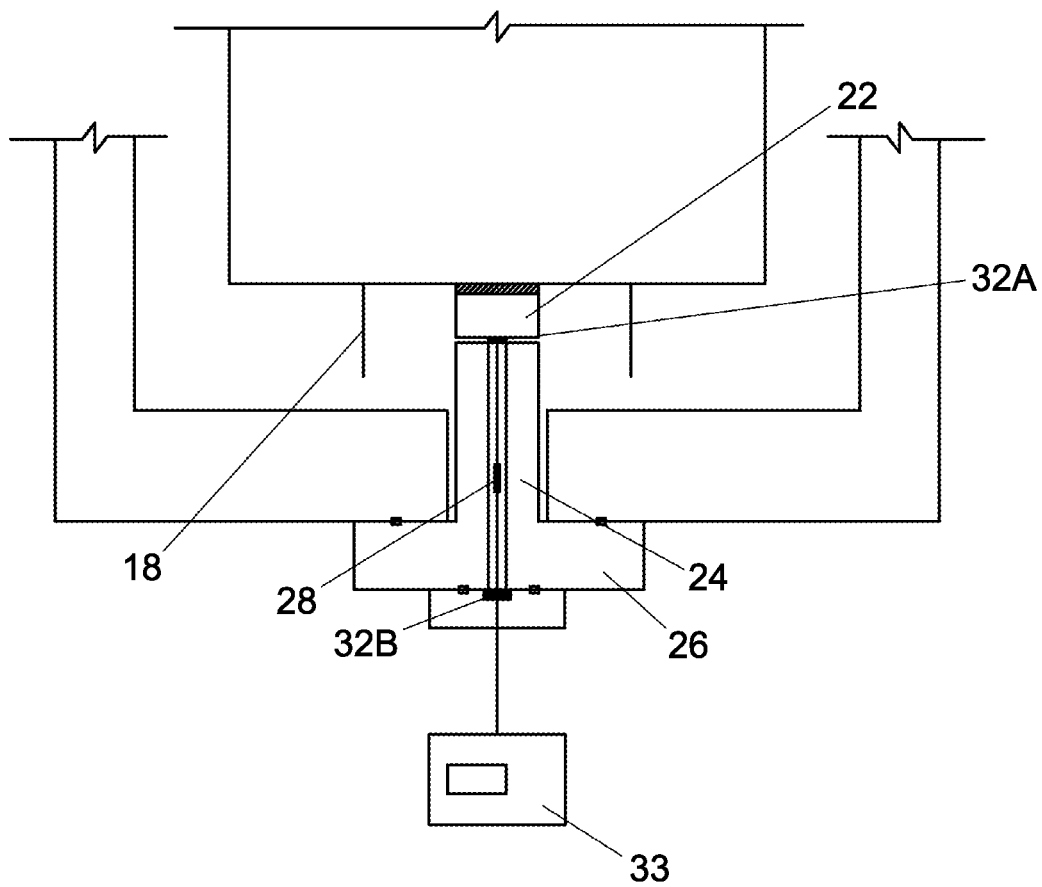
FIG. 3 is a schematic of a specialised load cell and plinth.
Figure 4:
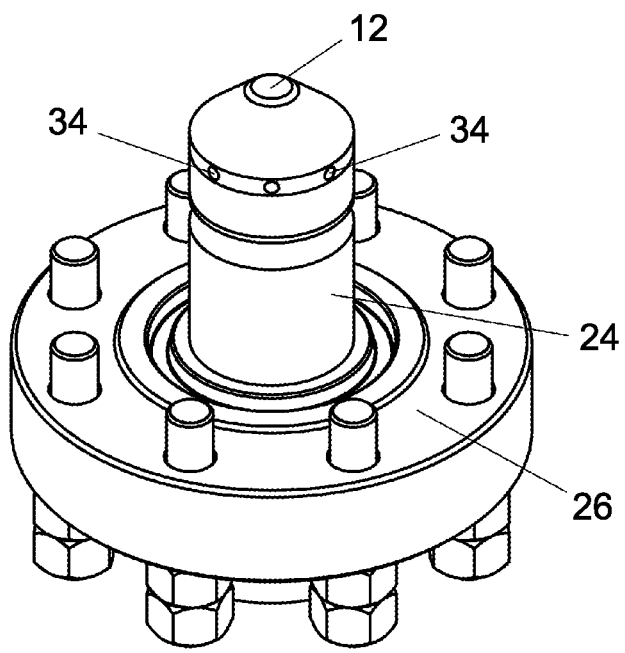
FIG. 4 is an isometric view of a load cell and plinth from above.

The LCA 14, shown in more detail in FIGS. 3 and 4, typically consists of (i) a strain gauge load cell 22, (ii) a plinth 24 which supports and sets the load cell at the correct axial height, (iii) a standardised high pressure flange 26 such as an API (American Petroleum Institute) flange which connects the LCA to the accumulator, (iv) an electrical cable 30, a connector 28 and seal glands 32A, 32B, which run through the plinth and API flange to (v) an external display 33. The plinth 24 and API flange 26 may be one single machined item.

A typical specification for the load cell assembly (LCA) is as follows:
    Design Pressure—0 to 20,000 psig
    Design Temperature—0 to 180 deg C
    Full Load (solids weight)—~2000 kg
    Resolution—~0.05 kg to 0.1 kg The load cell 22 is advantageously removable from the plinth to allow replacement of the cell; the external nozzle diameter for removal, being chosen to suit the load cell diameter. A cable 30 and processor/external display 33 is connected to the load cell 22 and has the ability to be disconnected (connector 28) from the plinth/API flange to allow replacement/repair.

A typical specification for the processor and external display is as follows:
    A user configurable record for the empty weight of the weighing platform (Tare value)
    Data logging function—time/tare/mass reading
    Real time separated solids mass and solids production rate display
    Cable connection pressure seal to be fire safe—I.e. no breach of containment in the event of an external fire.
    Advantageously, provision of a remote communications feed to pass a solids mass signal to an external processing facilities control system. This allows an alarm function to indicate that the accumulator is full which could, for example, be used to initiate an accumulator purge and/or could permit detection of a solids slug measured by a high mass increase rate etc to provide valuable online well solids production data.

By locating the load cell inside the accumulator 4 it is possible to measure the weight of solids in a high pressure vessel since only the cable exit needs to be sealed. This is typically achieved using a pair of gland seals 32A and 32B as shown in FIG. 3, which seal a generally axial channel in the plinth/API flange, which forms a conduit through which a signal cable passes.

This avoids the prior art problem of wasting a large portion of weight transducer measurement resolution simply to accommodate the effects of internal pressure, thus leaving only a small part of the measurement range available to measure mass of solids; thus reducing accuracy and/or increasing cost of the measurement system.

The problem of normalising the weight reading to allow for the forces applied by the high internal pressure in the accumulator vessel 4, is preferably dealt with by equalising the fluid pressures around the strain gauge elements so that the forces due to pressure in the vessel substantially cancel out. This provides a mechanically based pressure compensation means. With reference to FIG. 3, the LCA has top apertures 34 which lead to the face of a flexible internal diaphragm (not shown). The load cell elements are held in a sealed chamber and surrounded by a clean fluid such as oil. The diaphragm is pressurised on one side via the apertures 34 and applies pressure on the other side, to the clean fluid in the chamber so that the clean internal fluid is at the same pressure as the external fluids in the accumulator vessel. This arrangement means that the load on the load cell elements is substantially only that applied by the weight of solids in the load platform via button 12 at the top of the LCA, and is largely independent of the internal pressure in the accumulator vessel 4.

The LCA preferably has embedded temperature compensation. This embedded temperature compensation typically comprises two separate subsystems—a primary compensation electronic bridge incorporated into the primary strain gauge circuitry, and a secondary temperature sensing circuitry located within the force transducer housing providing temperature data, via the same signal pathway as the weight signal, to allow further fine compensation by the external controller's signal processing algorithms.

In summary, the load cell based separated solids monitoring system descried above has the following novel features for this application:

Submersible and internal with only the electrical signal crossing the pressure barrier.
Full sensor range used for separated solids weight measurement only and not compromised by loading due to internal system pressure providing much higher accuracy, repeatability and resolution attained when compared to prior art.
Pressure compensation performed through integral mechanical means rather than utilising an external pressure sensor to allow pressure compensation via signal analysis
Temperature compensation performed through electronic design of the load cell strain gauges
Temperature sensor imbedded in load cell design for secondary compensation through external signal analysis for high accuracy requirements
Primary and secondary containment sealing technology to allow designs up to to 20,000 psig operating pressures
External Controller allows datalogging capability so real time solids production rates can be monitored as well as separated solids weight.

The invention claimed is:

1. A separated solids monitoring system comprising a pressurised solids accumulator for receiving separated process solids, a weighing platform located inside the accumulator and arranged to carry process solids as they settle in the accumulator, a force transducer located inside the pressurised accumulator and mechanically coupled to the weighing platform to provide a weight signal which is a measure of gravitational force on the weighing platform, and mechanically based pressure compensation means integrated within the force transducer comprising a load cell contained in a sealed chamber filled with an incompressible fluid, and part of a wall of the chamber being flexible to form a diaphragm which allows external pressure from the accumulator vessel to be applied to the incompressible fluid so that the fluid is at the same pressure as the external fluids in the accumulator vessel, whereby the force transducer is arranged substantially to compensate and remove a force offset in the weight signal due to the pressure of fluids in the solids accumulator thereby allowing a fuller measurement range of the force transducer to be used and substantially dedicated to indicating a mass of solids on the weighing platform.

2. A monitoring system as claimed in clam 1, wherein the load cell has an element formed as a flexible substrate carrying a strain gauge, and wherein the substrate is surrounded by material at the same pressure as the internal pressure of the accumulator.

3. A monitoring system as claimed in claim 2, wherein the force transducer has embedded temperature compensation.

4. A monitoring system as claimed in claim 1, including a controller arranged to receive the weight signal from the force transducer and provide a signal representative of the weight of process solids in the weighing platform.

5. A monitoring system as claimed in claim 4, further including a pressure transducer for providing a pressure signal representative of the pressure inside the accumulator and wherein the controller is arranged to receive the pressure signal and include it in a calculation to provide the representative of the weight of process solids in the weighing platform.

6. A monitoring system as claimed in claim 1, further including a temperature transducer for providing a temperature signal representative of the temperature inside the sealed chamber and wherein a controller is arranged to receive the temperature signal, via the same signal pathway as the weight signal, and include it in a calculation to provide the representative of the weight of process solids in the weighing platform.

7. A monitoring system as claimed in claim 6, further including a pressure transducer for providing a pressure signal representative of the pressure inside the accumulator and wherein the controller is arranged to receive the pressure signal and include it in a calculation to provide the representative of the weight of process solids in the weighing platform.

8. A monitoring system as claimed in claim 1, arranged to operate with an accumulator pressure in excess of 6 Kpsig (414 barg).

9. A monitoring system as claimed in claim 1, wherein the pressurised solids accumulator is separate from a solids separator.

10. A monitoring system as claimed in claim 1, wherein the pressurised solids accumulator is integral with a solids separator.

11. A monitoring system as claimed in claim 1, wherein the force transducer has embedded temperature compensation.

* * * * *